US007817631B1

(12) United States Patent
Qian (10) Patent No.: US 7,817,631 B1
(45) Date of Patent: Oct. 19, 2010

(54) NETWORK TRANSFER PROTOCOL

(75) Inventor: Jiang Qian, Redwood Shore, CA (US)

(73) Assignee: Google Inc., Mountain View, CA (US)

( * ) Notice: Subject to any disclaimer, the term of this patent is extended or adjusted under 35 U.S.C. 154(b) by 99 days.

(21) Appl. No.: 12/169,928

(22) Filed: Jul. 9, 2008

(51) Int. Cl.
*H04L 12/56* (2006.01)

(52) U.S. Cl. .................. 370/389; 370/392; 370/394

(58) Field of Classification Search ............ None
See application file for complete search history.

(56) References Cited

U.S. PATENT DOCUMENTS

| 6,041,054 | A * | 3/2000 | Westberg ............... 370/389 |
| 6,112,323 | A * | 8/2000 | Meizlik et al. ........... 714/748 |
| 6,219,706 | B1 * | 4/2001 | Fan et al. ............... 709/225 |
| 6,477,590 | B1 * | 11/2002 | Habusha et al. .......... 710/29 |
| 7,486,671 | B2 * | 2/2009 | Taipale et al. ........... 370/389 |
| 2002/0118671 | A1 * | 8/2002 | Staples et al. ........... 370/352 |
| 2004/0013112 | A1 * | 1/2004 | Goldberg et al. ......... 370/389 |
| 2004/0215955 | A1 * | 10/2004 | Tamai et al. ............ 713/150 |
| 2006/0080439 | A1 * | 4/2006 | Chud et al. ............. 709/225 |
| 2006/0256817 | A1 * | 11/2006 | Durst .................... 370/466 |
| 2008/0037420 | A1 * | 2/2008 | Tang .................... 370/229 |
| 2008/0151881 | A1 * | 6/2008 | Liu et al. ............... 370/389 |
| 2008/0162679 | A1 * | 7/2008 | Maher et al. ............ 709/223 |
| 2008/0198787 | A1 * | 8/2008 | Nguyen ................. 370/315 |
| 2009/0219939 | A1 * | 9/2009 | Isosaari ................. 370/400 |

* cited by examiner

*Primary Examiner*—Jayanti K Patel
*Assistant Examiner*—Anthony Sol
(74) *Attorney, Agent, or Firm*—Fish & Richardson P.C.

(57) ABSTRACT

Systems, methods and computer program products facilitate communication on a network by transmitting a communication on the network from a first node to a second node, the communication including a first segment and a second segment. The first segment consists essentially of a destination port and a data length of the communication, and the second segment includes a payload and at least one of a connection ID, a sequence number, and an opcode. A responsive communication is then received from the second node, the responsive communication acknowledging receipt of the communication transmitted from the first node.

21 Claims, 5 Drawing Sheets

Data  350
- Connection ID (1 byte, Integer up to 255)
- Sequence Number
- Acknowledgement Number [Optional]
- Opcode (Identified Packet type)
- Window Size [Optional]
- Payload (Data Transferred)

NETWORK TRANSFER PROTOCOL

BACKGROUND

Communication protocols define the manner in which computers, such as nodes on the Internet, can communicate to transmit packets of information. Protocols typically should be effective, efficient, reliable, and resilient.

TCP is a core protocol within the Internet protocol suite. TCP is a stream based transport protocol that enables web servers and web clients to communicate over the Internet. It provides reliable, in-order delivery of a stream of data, which makes it suitable, e.g., for file transfers and e-mail. TCP is considered a reliable stream delivery service because it guarantees that a stream of data sent from one host to another without loss of data or data duplication. Because packet transfers on networks is not reliable, TCP uses positive acknowledgments with retransmission to guarantee the reliability of packet transfers, which requires a receiver to respond with an acknowledgment message as it receives the data. The sender keeps a record of each packet it sends, and waits for acknowledgment before sending the next packet.

Because TCP is optimized for accurate delivery rather than timely delivery, TCP delivery can result in long delays due to waiting times for out-of-order packets or retransmissions of lost packets. Thus, TCP is not particularly suitable for real-time applications, such as Voice over IP or online gaming.

Other protocols, like the User Datagram Protocol (UDP), may not incur the delays of TCP. UDP is a minimal, message-oriented protocol that is also one of the core protocols of the Internet protocol suite. Using UDP networked computers can facilitate the efficient transmission of short messages (datagrams) among the computers. Unlike TCP, however, UDP does not guarantee reliability or ordering of data. Therefore, datagrams may arrive out of order, appear duplicated, or go missing without notice. Because UDP fails to include overhead for checking whether every packet actually arrived at a destination, UDP is faster than TCP and can be used for applications that do not need guaranteed delivery. For instance, time-sensitive applications often use UDP because dropped packets are preferable to delayed packets.

Both TCP and UDP include undesirable features when executing a file transfer between two firewalled nodes (e.g., computers) on the Internet. TCP is a complex and inefficient protocol having a large header, and UDP is too unreliable. Still other protocols, such as RUDP, are also too complex for effecting file transfer.

SUMMARY

A reliable, packet-based network transfer protocol can utilize the basic structure provided by UDP to effect file transfers over networks such as the Internet. The new network transfer protocol utilizes a UDP header and embeds packets of information within a UDP payload to make the transfer protocol reliable. Similar to TCP, the network transfer protocol allows a recipient computer to acknowledge receipt of packets, and packets can be retransmitted when lost. Unlike TCP however, the network transfer protocol is packet-based and requires a very small header, for instance, a header size of 4 bytes, which simplifies the protocol.

The network transfer protocol described by this specification permits the uploading and downloading of files between direct peers. If both peers are firewalled, such that direct downloads are impossible because a session between the computers cannot be initiated, then a UDP hole punching mechanism can be employed using the network transfer protocol described herein. The network transfer protocol is particularly useful for executing file transfer, and is more simple and faster than TCP and more reliable than UDP.

In general, one aspect of the subject matter described in this specification can be embodied in methods, systems and computer program products. One method includes the actions of transmitting a communication on a network from a first node to a second node, where the communication includes a first segment (e.g., a header) and a second segment. The first segment includes a destination port and a data length of the communication, and the second segment includes a payload and at least one of a connection ID, a sequence number, and an opcode. The method also includes the actions of receiving a responsive communication from the second node, the responsive communication acknowledging receipt of the communication transmitted from the first node.

According to some features, the second segment can include an acknowledgement number, and/or a window size. According to another feature, the opcode can identify at least one of a sync packet and an acknowledgement packet. The method can also include estimating a round trip time based on a lapsed time between the transmission of the communication and the receipt of the responsive communication. According to yet another feature, the payload can be substantially larger in size than the first segment. The first segment can also include a source port.

Aspects of the invention can achieve none, one or more of the following advantages. File transfer may be achieved using a file transfer protocol that is reliable, like TCP, yet has very small overhead, like UDP.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

A reliable, packet-based network transfer protocol can utilize the structure provided by UDP to effect reliable file transfers over networks such as the Internet. The protocol described by this disclosure permits a very small header, for instance, a header size of 4 bytes. The protocol enables two firewalled nodes, e.g., computers, to transfer files directly between each other.

Figure 1A:
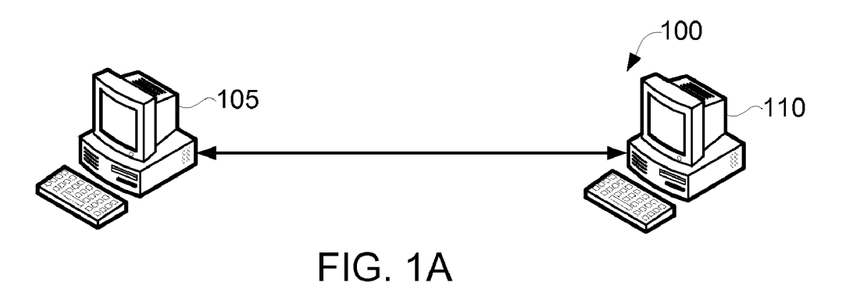
FIG. 1A is an example network including two Internet nodes in direct communication.

FIG. 1A shows an example network 100 including two peer nodes 105, 110 that are illustrated for simplicity in FIG. 1A as computers. In FIG. 1A the nodes 105, 110 are not firewalled, which permits direct uploading and downloading of files between the nodes 105, 110.

Figure 1B:
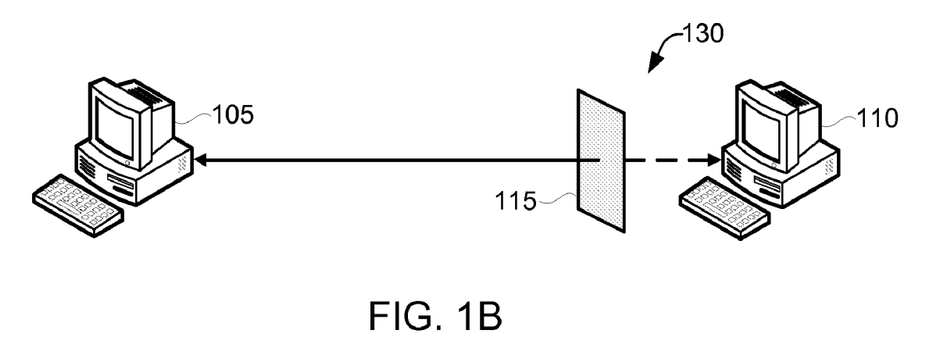
FIG. 1B is an example network including two Internet nodes in communication, where one node is firewalled.

FIG. 1B shows an example network 130 in which a first peer node 110 is firewalled by a firewall 115, while the second peer node 105 is not firewalled. In this network 130, direct uploading and downloading of files between the nodes 105, 110 requires mechanisms such as Push and Push Proxy, as are known to those of ordinary skill in the art, to permit execution of uploading and downloading.

Figure 1C:
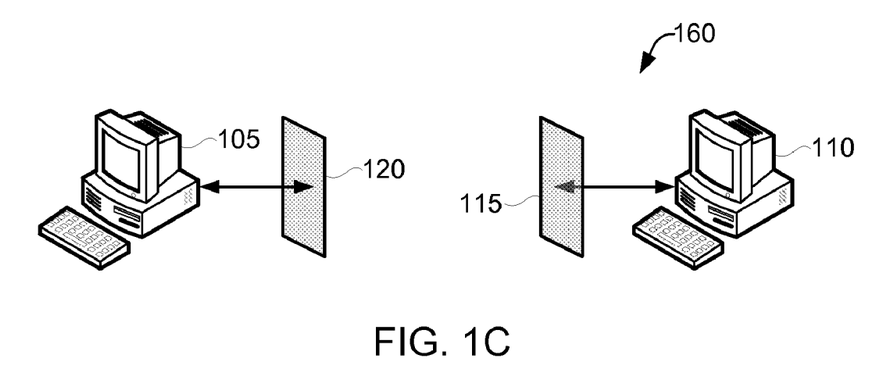
FIG. 1C is an example network including two Internet nodes, where both nodes are firewalled.

FIG. 1C shows an example network 160 in which both a first peer node 110 and second peer node 105 are firewalled by respective firewalls 115, 120. Because both nodes 105, 110 are firewalled a direct download of files between the nodes may not be possible because a session may not be able to be initiated between the nodes 105, 110.

Figure 2:
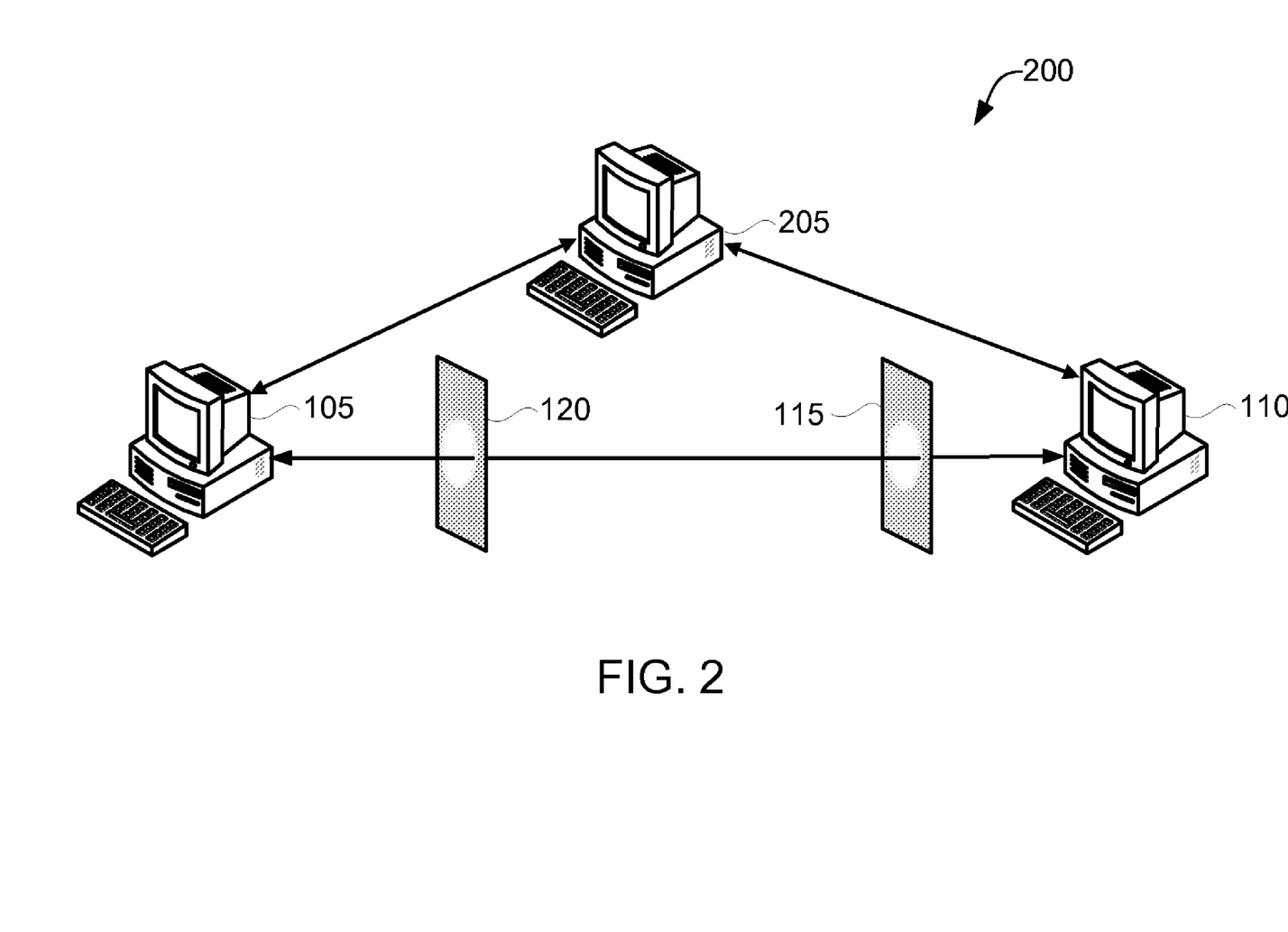
FIG. 2 is an example network including two Internet nodes in communication through holes punched through firewalls associated with each node.

FIG. 2 is another example network 200 that includes two Internet nodes 105, 110, each having respective firewalls 120, 115. In this example, the firewalls have holes permitting communication of the Internet nodes 105, 110. According to some implementations, the holes in the firewalls may be effected by a hole punching mechanism, such as using "UDP Hole Punching," a commonly used Network Address Translation traversal technique known to those of ordinary skill in the art.

In the network 200 shown in FIG. 2, before the nodes 105, 110 can download files directly to each other, in some implementations, they must first communicate with each other using a third party, represented here by a third party node 205 (represented for illustrative purposes by a computer in FIG. 2) accessible by each node 105, 110 via one or more non-firewalled communication channels. The third party node 205 acts as a middleman/proxy, temporarily, to permit the first two nodes 105, 110 to communicate with each other. Once the respective nodes 105, 110 have acknowledged that each wishes to form a connection with the other, the two firewalled nodes 105, 110 can send packets directly to each other, for example, through open holes in both firewalls 115, 120. In some implementations, the nodes 105, 110 can proceed to upload and download files directly with each other and the third party node 205 is no longer needed for the duration of that file transfer.

According to some implementations, UDP hole punching is a mechanism that can be used to open the holes in the respective firewalls 115, 120. When using a conventional form of UDP hole punching an outgoing UDP packet temporarily opens a hole in a firewall that returning UDP packets may traverse. If both firewalled nodes send properly addressed UDP packet to each other at around the same time (e.g., within a timeout period of a minute or two), holes will be opened on both firewalls and bidirectional communication can occur.

Integrating UDP Hole Punching method into existing network infrastructures may require new firewall detection logic, new node status levels, and connection setup and establishment procedures. Because UDP is not a reliable protocol, the reliable file transfer protocol described herein, which is based on UDP, can be used to more effectively perform hole punching in two nodes that wish to transfer files, e.g., over the Internet.

1.0 Example Headers for File Transfer Protocol

Figure 3:
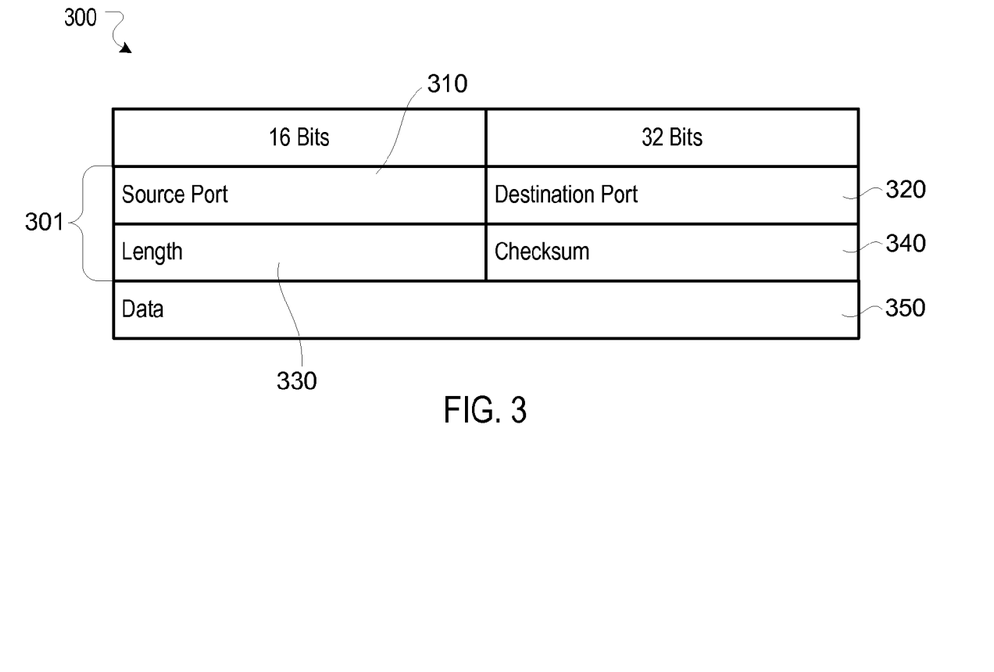
FIG. 3 shows an example 8 byte header for a file transfer protocol.

FIG. 3 shows an example protocol 300 for a proposed file transfer protocol. The protocol generally includes a header 301 as a first segment and data 350 as a second segment. The header 301 shown in FIG. 3 is a conventional UDP header. As described above, UDP does not provide the reliability and ordering guarantees that, e.g., TCP permits. Thus, using UDP data packets may arrive out of order or go missing without notice. However, due to the lack of the reliability overhead, UDP is faster and more efficient for time sensitive purposes and includes a header, with 8 bytes, that has very few fields as compared to a TCP header, which typically includes 20 bytes.

The first field within the header 301, source port 310, indicates which application sent the data contained within the (IP) packet, similar to a source port field used in TCP. Next, the destination port 320 indicates which application is to receive the data contained within the (IP) packet. The length field 330 indicates the length, in bytes, of the UDP header 301 and the data. Because the header is 8 bytes, subtracting 8 bytes from the number provided by the length field is equal to the byte size of the data being transmitted. The fourth field in the header 301 is the checksum 340. Because the UDP is not designed to ensure that transmitted data actually arrives at a destination, this field is optional and if not used, is set to 0.

The data 350 contains the actual payload being transmitted, as is described in greater detail below, along with embedded data (within one or more data fields) that facilitates reliable file transfers similar to TCP despite using the small, packet-based header 301 of the file transfer protocol.

Figure 4:
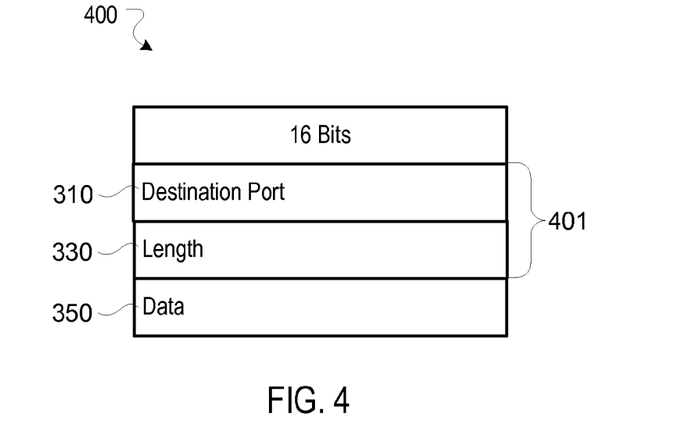
FIG. 4 shows an example 4 byte header for a file transfer protocol

FIG. 4 shows another example protocol 400 for a file transfer protocol. The protocol generally includes a 4-byte header 401 as a first segment and data 350 as a second segment. The implementation shown in FIG. 4 only requires a 16 bit sequence, although a 32 bit sequence could also be implemented. The header 401 excludes the source port 310 described above with respect to FIG. 3. The header 401 also excludes the checksum 340. Because the checksum is not used it is excluded completely rather than e.g., being set to zero. The data 350 is the same as illustrated in FIG. 3. Compared, for instance, to TCP, the file transfer protocol having the 4 byte header 401 shown in FIG. 4 includes a small packet header compared to stream-based TCP.

2.0 Data

Figure 5:
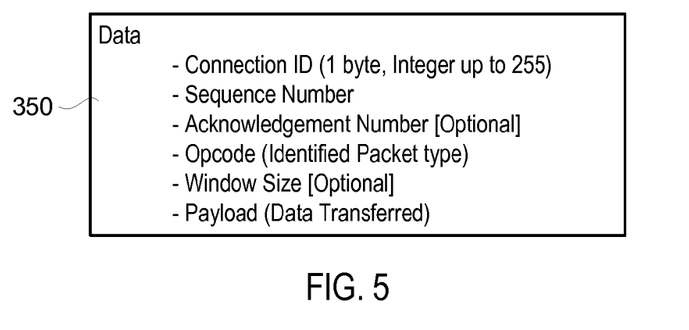
FIG. 5 shows an example data field within the headers of FIG. 3 or FIG. 4.

As described next with respect to FIG. 5, the data within second segment, such as within the data 350, can be used to facilitate reliable transmission of content, e.g., files, between peer nodes in the Internet. In particular, along with the payload of the transmission, the data 350 can include an embedded payload (i.e., data) for transmission from a sending node to a receiving node as well as data fields, at least some of which are similar to TCP header. The embedded payload, which can be contained within one or more data fields, ensure reliable transmission and receipt of the payload.

In some implementations, one such data field can include a connection ID. The connection ID can be an integer, for instance, a value up to 255 represented by a single byte. The connection ID identifies an application on a recipient computer that receives the data contained within the transmitted packets. The connection ID enables multiplexing of a single port to communicate with multiple peer computers, e.g., over multiple connections. The connection ID 320 is distinguishable, for instance, from the destination port in a UDP header because it can identify multiple peers that can each communicate with the same computer port instead of requiring a one to one correspondence. For instance, if a computer 'A'; opens a port 1 and a computer 'B' opens up port 1 for communication, without a connection ID only a single connection can be established. Using the connection ID computer 'A' can open up two or more connections between computer 'A' and computer 'B', or between computer 'A', computer 'B', and one or more other computers. Connection IDs may be examined by firewalls to establish whether two peer computers can communicate through a firewall.

In some implementations, another data field within the data 350 can be a sequence number, which can include up to several bytes and is similar to a TCP sequence number. Each packet transmitted to a receiving node can include a sequence number. Once all the packets have arrived at the receiving node, the sequence number is used to ensure that all of the packets actually arrived and are in the correct sequence.

The data 350 can optionally also include a data field including an acknowledgement number, which can also include several bytes. In some implementations, if an ACK flag is set, then the value of this field is the next expected byte that the receiving node is expecting.

One or more Opcodes can also be included in data fields within the data 350, where each Opcode identifies packet types transmitted or received by a sending node. In some implementations, Opcodes can identify six different types of packets:

Sync packets (OP_SYN=0x0)
Out of Order Ack (OP_ACK=0x1)
Normal Ack (OP_ACK_CT_NORMAL=0x2)
Delay Ack (OP_ACK_CT_DELAY=0x3)
Data (OP_DATA=0x4)
Fin (OP_FIN=0x5)

where Sync packets are synchronization packets for establishing a connection and punching a hole through a firewall, Ack packets are acknowledgement packets, Data packets represent the payload, and Fin packets close the connection. A Normal Ack can be used to indicate than an in-order packet is received, and a Delay Ack can be used to indicate that an in-order packet is received using a delay algorithm, which may be indicated when a round trip time (RTT), as explained below, is exceeded.

The data 350 can also optionally include a window size field, which can identify the size of a receive window. In some implementations, the receive window specifies the number of bytes that the receiver is currently willing to receive.

Finally, the data 350 also includes the actual payload (i.e., data) to be transmitted from a sending node to a receiving node.

3.0 Basic Message Definitions

According to some implementations, a basic file transfer protocol message may be defined as:
struct UdpMsg
{
uint8 peerConnID;
uint8 opcode:3; // store type of the packet
// wnd is not size of window, but
// number of packets that can be contained in the window
// Max value 11111=31,
// Receiver use it to control sender's speed.
uint8 wnd:5;
// store SeqNum
uint16 seq;
};

In some implementations, the message can contain both Ack and Data (i.e., payload). In some implementations, if a message is bigger than 6 bytes, then it contains data, otherwise it is an Ack message:

struct UdpDataAckMsg: UdpMsg
{
    uint16 dataSeqNum; // ack
};

In some implementations, a sync message is 6 bytes:
struct UdpSynMsg: UdpMsg
{
// Used to share same port with many connection
    uint8 connID;
    uint8 protocolVersionNumber; // set to 0 for first version
};

A receiving node of Sync message identifies the connection identifier (i.e., connID), and in response sets the UDP message peer connection Id (i.e., UdpMsg.peerConnID) to this connection ID for all subsequent packets so that communication can reach the transmitting node. In some implementations, there can be a timeout for a Sync message after a period of time, for instance, 20 seconds. According to some implementations, the sequence number (SeqNum) is incremented only after a Data or Syn message is transmitted, and message retransmissions do not change the sequence number.

According to some implementations, when a packet identified by an out of order sequence number is received, if it is bigger than a maximum buffer value of the receiving node (or of a routing node, e.g., router, between the sending and receiving node) it will be dropped. Otherwise it will be stored. According to some implementations, the timeout period for transmission of a data packet is based on an round trip time (RTT). In some implementations, the RTT for the proposed file transfer protocol may be based on the same RTT definition for TCP, which is the round trip time from transmission of a packet to receipt of an acknowledgment (Ack) message.

In some implementations, the sending node can employ a retransmission timer that is based on the estimated RTT between the sender and receiver, or a variance of the RTT. In some implementations, if a retransmission is attempted multiple times, exceeding a maximum retry value, with no acknowledgement (Ack) response, the connection between the sending and receiving nodes will be dropped.

In some implementations the RTT can be calculated when receiving the first acknowledgement message (ACK) to the first transmission of the data packet. Otherwise, no RTT is recorded. According to some implementations the RTT can be calculated using other well known methods for TCP communication.

4.0 Example Connection Sequence

Figure 6:
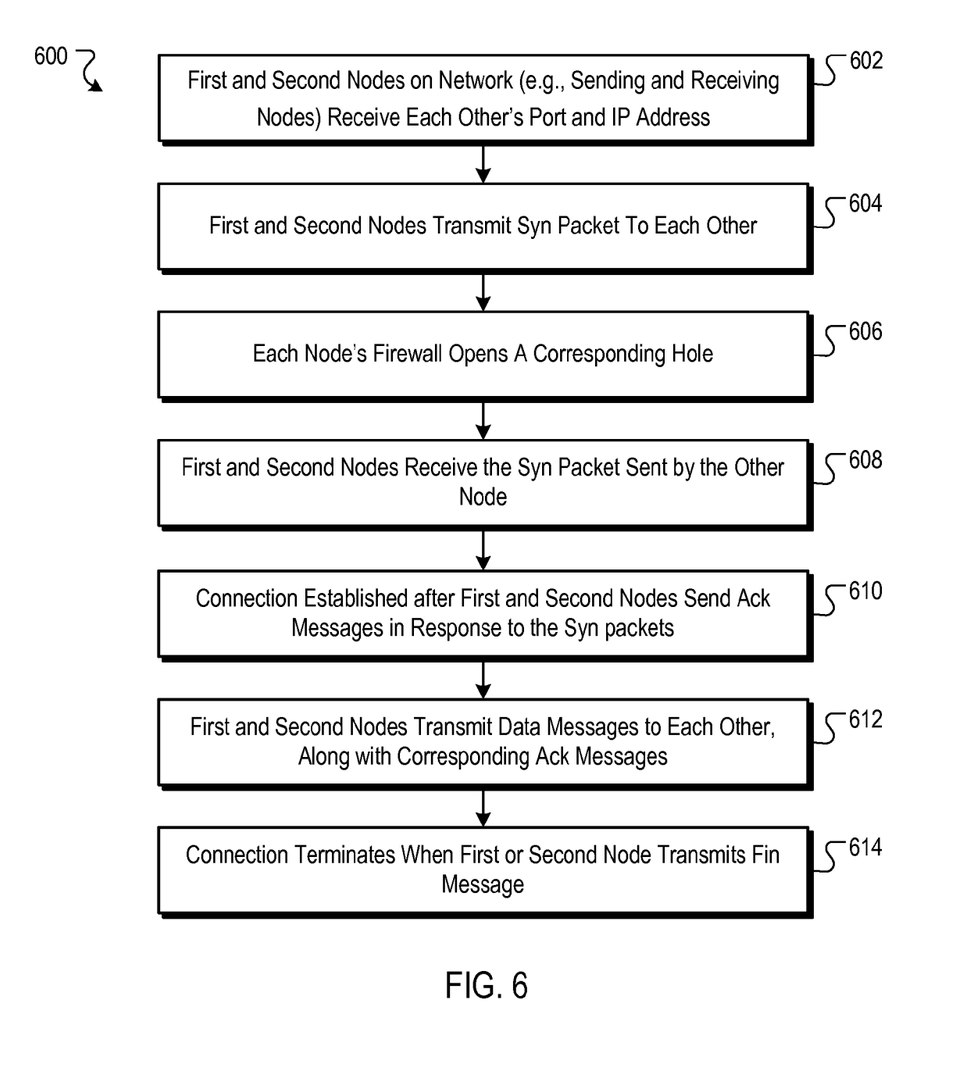
FIG. 6 is a flow chart of an example connection sequence.

FIG. 6 is a flow chart of an example connection sequence 600 using the file transfer protocol when a first firewalled node (e.g., a receiving node) attempts to download a file from a second firewalled node (e.g., a sending node). The two nodes may represent peer computers, e.g., on the Internet. First, at stage 602 both nodes receive each other's external port and IP address, for instance, as identified in the destination port of a header 301 or 401. Next, at stage 604 both nodes transmit a Sync packet to each other's external IP address. The Syn packet is identified, for instance, in the data field 350 of the protocol 300 or 400.

The firewall associated with each node opens a corresponding hole at stage 606. At stage 608 both the first and second nodes receive the Sync packets sent by the other node. At stage 610 a connection is established after both nodes send an acknowledgement (Ack) communication in response to the Sync packets. At stage 612 the first and second nodes transmit Data messages to each other, along with corresponding acknowledgement (Ack) data messages confirming receipt of the Data in order. Finally, at stage 614 the connection is terminated when one of the nodes transmits a finished (Fin) message.

5.0 Congestion Control and Window Size

In reliable networks communication performance can fall due to network congestion. Sending nodes can alter the behavior of the flow of data to avoid congestion when using the file transfer protocol described herein. Specifically, congestion control is handled by sending nodes using a sliding window. The window size determines how many packets can be sent and outstanding (waiting for an Ack response) at any given time. A receiving node tells the sender this window size to enable the receiver to control the speed.

According to some implementations, an initial sliding window size can be set, for instance, to 5. The maximum size can be the maximum size of the receiving node and the minimum size may be 1. The window size may be reduced when an Out of Order acknowledgement (Ack) is received by the sending node. On the other hand, the window size may be increased when the sending node receives an In Order acknowledgement. Additionally, the window size may be reduced to 1 when retransmittal is required. According to some implementations, the send buffer queue size is checked each second, and the window is reduced in size when the send buffer queue has data, and increased in size when the send buffer queue is empty. Thus, the congestion control is adjusted inversely to RTT. Still other window size alterations may be employed. For instance, the file transfer protocol can employ similar sliding window.

Figure 7:
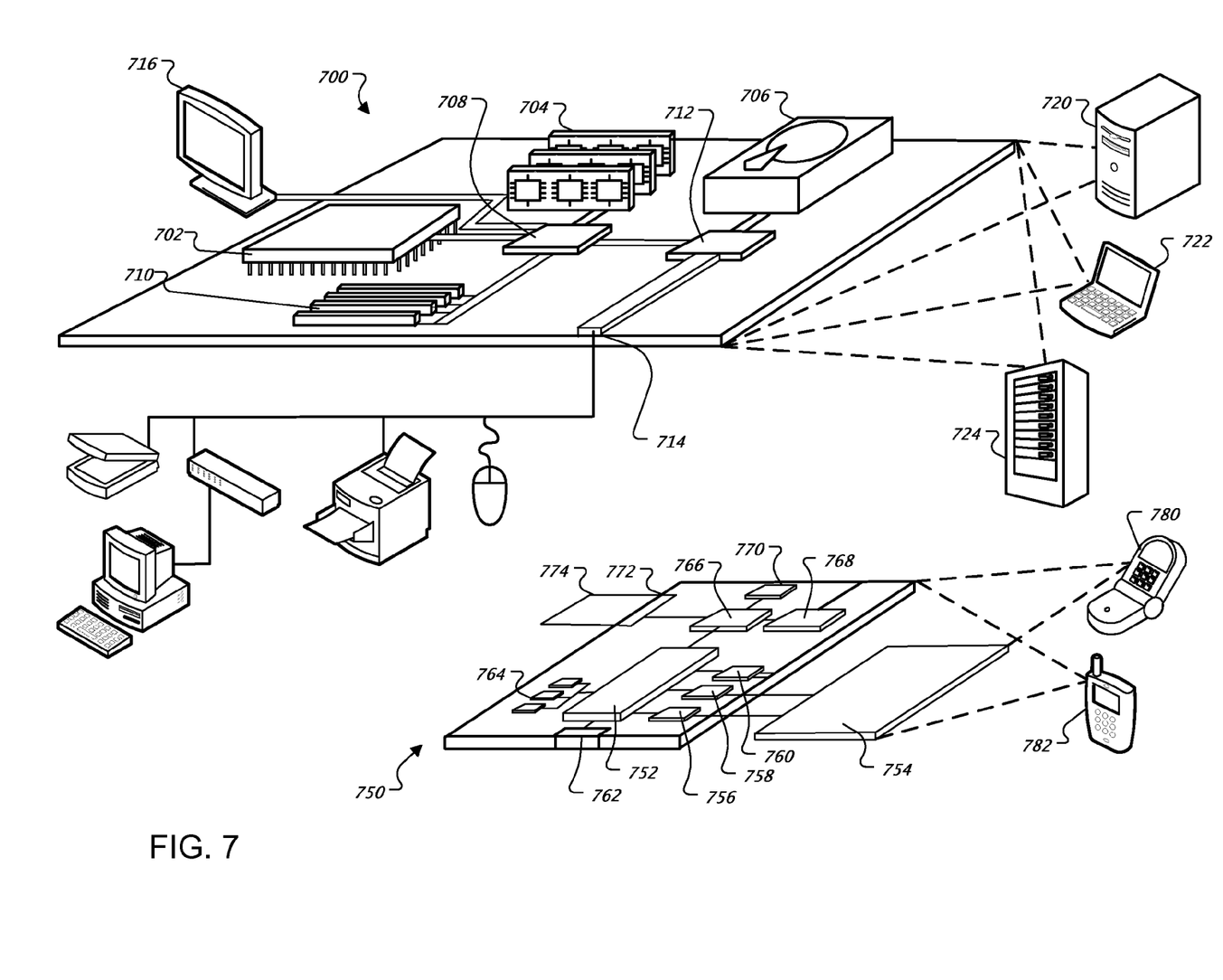
FIG. 7 shows an example of a generic computing device and a generic mobile device.

FIG. 7 shows an example of a generic computing device 700 and a generic mobile computing device 750, which may be used to facilitate communications using the techniques described here.

According to some implementations, the generic computing device 700 can represent a transceiver that can transmit and/or receive communications using the protocol described herein. The transceiver can include a formatter for formatting communications using the protocol described herein, and a receiver for receiving communications using the protocol described herein.

The computing device 700 is intended to represent various forms of digital computers, such as laptops, desktops, workstations, personal digital assistants, servers, blade servers, mainframes, and other appropriate computers. The computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network).

Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. For example, various forms of the flows shown above may be used, with steps re-ordered, added, or removed. Also, although several applications of the payment processing systems and methods have been described, it should be recognized that numerous other applications are contemplated. Moreover, although many of the implementations have been described in relation to a so-called shopping cart, that term should be understood to include various forms of mechanisms for presenting an organized grouping of items or servers that a user has selected for possible purchase, and can include such descriptions as shopping baskets and the like. Accordingly, other implementations are within the scope of the following claims.

The invention claimed is:

1. A communication method, comprising:
    transmitting a packet on a network from a first node to a second node, the packet comprising:
        a header that includes information that identifies a destination port and a data length of the packet, and that excludes a data field that identifies a source port and a data field that identifies a checksum; and
        a data segment comprising a payload and data that identifies at least one of a connection identifier, a sequence number, or an opcode, and further comprising data that represents an acknowledgement number that identifies a next expected byte that the second node is expecting, and a window size that identifies a quantity of packets that the first node is able to send and have outstanding, without acknowledgement by the second node, at any given time; and
    receiving a responsive packet from the second node, the responsive packet acknowledging receipt of the packet transmitted from the first node.

2. The method of claim 1, wherein the header only includes the information that identifies the destination port and the data length.

3. The method of claim 1, wherein the header comprises exactly 4 bytes.

4. The method of claim 1, wherein:
    the data segment comprises data that identifies the connection identifier, and
    the connection identifier identifies one or more applications on the second node that are to receive the payload.

5. The method of claim 4, wherein the connection identifier identifies two or more applications on the second node that are to receive the payload.

6. The method of claim 5, wherein the two or more applications share a single port.

7. A communication method, comprising:
    transmitting a packet on a network from a first node to a second node, the packet comprising:
        a header that includes information that identifies a destination port and a data length of the packet, and that excludes a data field that identifies a source port and a data field that identifies a checksum; and
        a data segment comprising a payload and data that identifies at least one of a connection identifier, a sequence number, or an opcode;
    receiving a responsive packet from the second node, the responsive packet acknowledging receipt of the packet transmitted from the first node;
    determining, by the first node, that the responsive packet from the second node is an out-of-order acknowledgment; and
    decreasing, by the first node, a window size responsive to determining that the responsive packet from the second node is an out-of-order acknowledgement, wherein the window size identifies a quantity of packets that the first node is able to send and have outstanding, without acknowledgement by the second node, at any given time.

8. A communication method, comprising:
    transmitting a packet on a network from a first node to a second node, the packet comprising:
        a header that includes information that identifies a destination port and a data length of the packet, and that excludes a data field that identifies a source port and a data field that identifies a checksum; and
        a data segment comprising a payload and data that identifies at least one of a connection identifier, a sequence number, or an opcode;
    receiving a responsive packet from the second node, the responsive packet acknowledging receipt of the packet transmitted from the first node;
    determining, by the first node, that the responsive packet from the second node is an in-order acknowledgement; and
    increasing, by the first node, a window size responsive to determining that the responsive packet from the second node is an in-order acknowledgement, wherein the window size identifies a quantity of packets that the first node is able to send and have outstanding, without acknowledgement by the second node, at any given time.

9. A system comprising:
    one or more computers; and
    a non-transitory computer-readable medium coupled to the one or more computers having instructions stored thereon which, when executed by the one or more computers, cause the one or more computers to perform operations comprising:
        transmitting a packet on a network from a first node to a second node, the packet comprising:
            a header that includes information that identifies a destination port and a data length of the packet, and that excludes a data field that identifies a source port and a data field that identifies a checksum; and
            a data segment comprising a payload and data that identifies at least one of a connection identifier, a sequence number, or an opcode, and further comprising data that identifies an acknowledgement number that identifies a next expected byte that the second node is expecting, and a window size that identifies a quantity of packets that the first node is able to send and have outstanding, without acknowledgement by the second node, at any given time; and
        receiving a responsive packet from the second node, the responsive packet acknowledging receipt of the packet transmitted from the first node.

10. The system of claim 9, wherein the header only includes the information that identifies the destination port and the data length.

11. The system of claim 9, wherein the header comprises exactly 4 bytes.

12. The system of claim 9, wherein:
the data segment comprises data that identifies the connection identifier, and
the connection identifier identifies one or more applications on the second node that are to receive the payload.

13. The system of claim 12, wherein the connection identifier identifies two or more applications on the second node that are to receive the payload.

14. The system of claim 13, wherein the two or more applications share a single port.

15. A system comprising:
one or more computers; and
a non-transitory computer-readable medium coupled to the one or more computers having instructions stored thereon which, when executed by the one or more computers, cause the one or more computers to perform operations comprising:
transmitting a packet on a network from a first node to a second node, the packet comprising:
a header that includes information that identifies a destination port and a data length of the packet, and that excludes a data field that identifies a source port and a data field that identifies a checksum; and
a data segment comprising a payload and data that identifies at least one of a connection identifier, a sequence number, or an opcode; and
receiving a responsive packet from the second node, the responsive packet acknowledging receipt of the packet transmitted from the first node;
determining, by the first node, that the responsive packet from the second node is an out-of-order acknowledgment; and
decreasing, by the first node, a window size responsive to determining that the responsive packet from the second node is an out-of-order acknowledgement, wherein the window size identifies a quantity of packets that the first node is able to send and have outstanding, without acknowledgement by the second node, at any given time.

16. A system comprising:
one or more computers; and
a non-transitory computer-readable medium coupled to the one or more computers having instructions stored thereon which, when executed by the one or more computers, cause the one or more computers to perform operations comprising:
transmitting a packet on a network from a first node to a second node, the packet comprising:
a header that includes information that identifies a destination port and a data length of the packet, and that excludes a data field that identifies a source port and a data field that identifies a checksum; and
a data segment comprising a payload and data that identifies at least one of a connection identifier, a sequence number, or an opcode; and
receiving a responsive packet from the second node, the responsive packet acknowledging receipt of the packet transmitted from the first node;
determining, by the first node, that the responsive packet from the second node is an in-order acknowledgement; and
increasing, by the first node, a window size responsive to determining that the responsive packet from the second node is an in-order acknowledgement, wherein the window size identifies a quantity of packets that the first node is able to send and have outstanding, without acknowledgement by the second node, at any given time.

17. A non-transitory computer storage medium encoded with a computer program, the program comprising instructions that when executed by data processing apparatus cause the data processing apparatus to perform operations comprising:
transmitting a packet on a network from a first node to a second node, the packet comprising:
a header that includes information that identifies a destination port and a data length of the packet, and that excludes a data field that identifies a source port and a data field that identifies a checksum; and
a data segment comprising a payload and data that identifies at least one of a connection identifier, a sequence number, or an opcode, and further comprising data that represents an acknowledgement number that identifies a next expected byte that the second node is expecting, and a window size that identifies a quantity of packets that the first node is able to send and have outstanding, without acknowledgement by the second node, at any given time; and
receiving a responsive packet from the second node, the responsive packet acknowledging receipt of the packet transmitted from the first node.

18. The computer storage medium of claim 17, wherein the header only includes the information that identifies the destination port and the data length.

19. The computer storage medium of claim 17, wherein the header comprises exactly 4 bytes.

20. A non-transitory computer storage medium encoded with a computer program, the program comprising instructions that when executed by data processing apparatus cause the data processing apparatus to perform operations comprising:
transmitting a packet on a network from a first node to a second node, the packet comprising:
a header that includes information that identifies a destination port and a data length of the packet, and that excludes a data field that identifies a source port and a data field that identifies a checksum; and
a data segment comprising a payload and data that identifies at least one of a connection identifier, a sequence number, or an opcode; and
receiving a responsive packet from the second node, the responsive packet acknowledging receipt of the packet transmitted from the first node;
determining, by the first node, that the responsive packet from the second node is an out-of-order acknowledgment; and
decreasing, by the first node, a window size responsive to determining that the responsive packet from the second node is an out-of-order acknowledgement, wherein the window size identifies a quantity of packets that the first node is able to send and have outstanding, without acknowledgement by the second node, at any given time.

21. A non-transitory computer storage medium encoded with a computer program, the program comprising instructions that when executed by data processing apparatus cause the data processing apparatus to perform operations comprising:

transmitting a packet on a network from a first node to a second node, the packet comprising:
  a header that includes information that identifies a destination port and a data length of the packet, and that excludes a data field that identifies a source port and a data field that identifies a checksum; and
  a data segment comprising a payload and data that identifies at least one of a connection identifier, a sequence number, or an opcode; and
receiving a responsive packet from the second node, the responsive packet acknowledging receipt of the packet transmitted from the first node;

determining, by the first node, that the responsive packet from the second node is an in-order acknowledgement; and increasing, by the first node, a window size responsive to determining that the responsive packet from the second node is in-order acknowledgement, wherein the window size identifies a quantity of packets that the first node is able to send and have outstanding, without acknowledgement by the second node, at any given time.

* * * * *

UNITED STATES PATENT AND TRADEMARK OFFICE
CERTIFICATE OF CORRECTION

| | | |
|---|---|---|
| PATENT NO. | : 7,817,631 B1 | Page 1 of 1 |
| APPLICATION NO. | : 12/169928 | |
| DATED | : October 19, 2010 | |
| INVENTOR(S) | : Jiang Qian | |

It is certified that error appears in the above-identified patent and that said Letters Patent is hereby corrected as shown below:

In column 16, line 7, claim 21, delete "is" and insert -- is an --, therefor.

Signed and Sealed this

Twenty-first Day of December, 2010

David J. Kappos
*Director of the United States Patent and Trademark Office*